Patented Sept. 2, 1952

2,609,324

UNITED STATES PATENT OFFICE 2,609,324

RECOVERY OF BACITRACIN

Murray Senkus and Peter C. Markunas, Terre Haute, Ind., assignors to Commercial Solvents Corporation, Terre Haute, Ind., a corporation of Maryland No Drawing. Application October 12, 1949, Serial No. 121,060

6 Claims. (Cl. 167—65)

This invention relates to the recovery of bacitracin. More particularly, it relates to the water extraction of bacitracin from water-immiscible aliphatic alcohol solutions thereof.

The antibiotic bacitracin is produced by the propagation of the organism Bacillus subtilis on a nutrient medium under aerobic conditions in much the same manner as penicillin is produced. The bacitracin in the fermented medium, however, is present only in relatively small quantities, i. e. of the order of 50–100 units per milliliter. The separation and recovery of this small amount of material from a large volume of medium of complex character presents numerous difficulties.

The prior processes are illustrated by the disclosure in U. S. Patent No. 2,457,887, granted January 4, 1949, to J. T. Goorley. According to the disclosure of this patent, bacitracin is first separated from the fermented medium in which it is produced by adsorption on an adsorbent such as activated alumina or activated carbon. After separating the adsorbed material from the fermentation medium the bacitracin is eluted from the adsorbent by treatment with a mixture of a dilute aqueous solution of an acid such as hydrochloric acid and an organic solvent that is inert with respect to bacitracin, such as butanol or other water insoluble aliphatic alcohol. After neutralization of the acid solution the butanol or other similar solution is next treated with an adsorbent to remove impurities, followed by extraction of the liquid with water and an immiscible organic solvent, such as chloroform, which decreases the solubility of bacitracin in butanol so that the bacitracin goes into the water phase which may then be concentrated or carried to dryness.

According to an alternate procedure, the bacitracin may be extracted directly from the fermented medium at a pH close to 7.0 with a solvent such as butanol instead of by adsorption followed by elution as described above. This step is followed by the transfer of bacitracin from butanol to water. It consists of first mixing the butanol with ether and water. Since ether is more soluble in butanol than in water, it goes into solution in the butanol driving the bacitracin into the water layer. This step is repeated several times ending up with the bacitracin in the water layer from which the bacitracin can be recovered by the use of suitable drying methods.

The above and all other previously suggested processes for the recovery and purification of bacitracin and particularly the step of transferring bacitracin from butanol into water have been subject to numerous disadvantages because of the low yields of relatively impure bacitracin which are obtained. We have now discovered that the overall yields of bacitracin can be very materially increased and the recovery and purification procedure shortened and simplified by following our improved process for the transfer of the bacitracin from the butanol solution into water from which the bacitracin is subsequently recovered by drying or other suitable methods. By our improved process we are able to transfer substantially all of the bacitracin in the butanol solution into water.

In carrying out our improved process for the recovery and purification of bacitracin we first produce a butanol, or other water-immiscible aliphatic alcohol, solution of bacitracin either by direct extraction at pH close to 7.0, preferably pH 7.5 of fermented medium containing bacitracin or by any other suitable means. This butanol solution containing bacitracin is next mixed with water and the pH of the resulting solution adjusted within particular limits with an acid selected from the group consisting of phosphoric, pyrophosphoric, sulfuric, and citric acid. This mixture separates into an alcohol layer and a water layer containing the bacitracin.

The ratio of the concentration of bacitracin left in the butanol in units per ml. to the concentration of bacitracin in water to which it has been extracted in units per ml. is known as the distribution coefficient. This coefficient is indicative of the success of the extraction process and since the extraction is from butanol to water, it is desirable to obtain distribution coefficients as low as possible.

In the single extraction operation in our improved process we have obtained distribution coefficients ranging from 0.02 to 0.4, depending upon the additive used to regulate the pH of the solution and the conditions under which the extraction was carried out as compared to the distribution coefficient of approximately 1 when hydrochloric acid is used under the same conditions to adjust the pH and even after as many as six successive extraction contacts of new volumes of water with the same butanol solution the distribution coefficient reached an average of only approximately 0.25 for the overall extraction when hydrochloric acid was used. This compares with a distribution coefficient as low as 0.02 with no more than 4 extraction contacts in our improved process. In other words, using hydrochloric acid a single extraction transferred only about 50% of the bacitracin from the butanol to the water layer whereas in our improved process 98% or more of the bacitracin was transferred from the butanol to the water layer in a single operation under the same conditions thus effecting great economies in both time, material and labor. The use of the relatively small amount of acid in our process amounts to a considerable saving over the relatively large amount of other solvents required in the prior art processes. The recovery of even a relatively small additional amount of expensive bacitracin obviously amounts to a very important advantage in the use of our process. These together with the greatly reduced number of operations required to give a higher yield of the desired product have resulted in very important savings.

In carrying out our improved process for the extraction of bacitracin from butanol or other water-immiscible aliphatic alcohol, with water we have discovered that the selection of the acid used in adjusting the pH of the mixture is of extreme importance. The use of phosphoric, pyrophosphoric, sulfuric and citric acids gives yields which greatly exceed those when other acids are used. Of the acids which we found to give good results we prefer to use phosphoric since with it the distribution coefficient obtained is less than 0.1 and the optimum pH can be reached without the use of large quantities of acid. The distribution coefficient obtained with the other named acids increases progressively up to approximately 0.3 with citric acid for a single extraction. But, with citric acid, a yield of approximately 72% bacitracin was obtained in a single extraction.

We have discovered that in order to obtain satisfactory results in our improved process the pH of the aqueous layer must be maintained at a value below approximately 4.0, the distribution coefficient decreasing as the pH is lowered to 2.0 and increasing slightly as the pH is lowered below 2.0. Unfortunately, however, bacitracin becomes unstable at low pH's, 10% of the activity being lost at a pH of 1.6 when allowed to stand four hours at 27° C. and 33% at the end of 24 hours. Unless, therefore, the extraction is completed in a relatively short time interval and the pH of the solution promptly raised it is impractical to carry out the extraction at a pH lower than 2.0. We have accordingly, therefore, found it most practical to operate our process at a pH of approximately 2.0 since bacitracin destruction is low and the distribution coefficient at a minimum at this point. Below this pH the rate of destruction rapidly increases and above it and below it the distribution coefficient increases.

We have found that the distribution coefficient also is dependent on still another factor, namely the volume ratio of water-immiscible alcohol such as butanol to water. For example, as the ratio of alcohol to water decreases the distribution coefficient also decreases. This relation is inconsistent with one of the objects of the extraction, that is, volume reduction. However, if more than one extraction of the butanol is to be made considerations of volume reduction can largely be disregarded in carrying out the first extraction. We have found that volume ratios up to 20 volumes of solvent to 1 volume of water are operative in our process, the optimum results, however, being obtained when using a 1:1 ratio. Where, however, a substantial reduction in volume is required it is sometimes advisable to use higher ratios even though a somewhat higher distribution coefficient is thus obtained.

In the extraction of bacitracin from the fermented medium the solvent customarily used to effect extraction is butanol. The lower aliphatic alcohols are not operative due to the fact that they are completely miscible with water and accordingly the extraction of bacitracin from the alcohol into water cannot be accomplished. The water-immiscible homologs of butanol as for example the amyl alcohols can also be satisfactorily employed in our process. Similarly, aliphatic alcohols with molecular weights higher than that of amyl alcohol are operative to a certain degree but bacitracin becomes more insoluble as the molecular weight of the alcohol increases and alcohols above amyl alcohol are accordingly not generally used in the extraction of bacitracin from the fermented medium.

In carrying out our invention we prefer to employ the following procedure; however, we do not intend to limit ourselves to it, it being understood that the ratios of solvent to water can be varied as desired in accordance with the disclosure made above: to 1 part of a water-immiscible alcoholic extract, such as the butanol or amyl alcohol extract of bacitracin from a fermentation beer, 1 part of water is added. The mixture is agitated and the pH adjusted to 2.0, preferably with phosphoric acid. Agitation is continued for approximately 15 minutes and the mixture is then allowed to form an aqueous layer and a water-immiscible alcohol layer. The layers are separated and if desired the process is repeated by reextracting the water-immiscible alcohol layer with an equal volume of water. The composite of the water layers containing the bacitracin is then treated in any manner desired for the recovery of the bacitracin, as for example by drying or by an extraction followed by removal of the solvent.

The following examples are given to illustrate my invention and are not to be construed as limiting it to the exact conditions prescribed:

EXAMPLE I

One volume (3510 ml.) of a butanol extract of bacitracin containing 200 u./ml. from a bacitracin fermentation beer was mixed with 1 volume (3510 ml.) of water. The mixture was agitated and the pH adjusted to 2.0 by the addition of phosphoric acid. Agitation was continued for an additional 15 minutes and the mixture then allowed to separate into layers. The water layer, 3490 ml., contained 190 u./ml., or 95% of the bacitracin in the original butanol layer. The spent butanol layer contained 4 u./ml.; the extraction coefficient, $$\frac{u./ml. \text{ in butanol}}{u./ml. \text{ in } H_2O}$$

being 0.02.

EXAMPLE II

One volume (100 ml.) of a butanol extract of bacitracin was mixed with 1 volume (100 ml.) of water. The mixture was agitated and the pH adjusted to 3.0 by the addition of phosphoric acid. Agitation was continued for an additional 15 minutes and the mixture then allowed to separate into layers. Analysis of the layers showed that 94% of the bacitracin had been transferred to the water layer.

EXAMPLE III

Ten volumes (4000 ml.) of a butanol extract of bacitracin containing 195 u./ml. from a bacitracin fermentation beer was mixed with 1 volume (400 ml.) of water. The mixture was agitated and the pH adjusted to 2.0 with phosphoric acid. Agitation was then continued for an additional 15 minutes and the mixture then permitted to form into layers and the latter separated and assayed. The butanol layer was reextracted several times with fresh 400 ml. portions of water, the pH being adjusted to 2.0 with phosphoric acid for each extraction. The results obtained after each extraction are shown in Table I.

Table I

| Contact No. | Assay u./ml. | | Percent of Original Bacitracin in water layer | Distribution Coefficient |
|---|---|---|---|---|
| | $H_2O$ | Butanol | | |
| 1 | 900 | 76 | 52 | 0.08 |
| 2 | 455 | 25 | 25 | 0.06 |
| 3 | 150 | 6 | 9 | 0.04 |
| 4 | 95 | 1 | 2 | 0.02 |
| 5 | 20 | 0.2 | 1 | 0.01 |

EXAMPLE IV

To one volume (100 ml.) of butanol and 1 volume (100 ml.) of water was added 2.8 g. of bacitracin. The mixture was agitated and the pH adjusted to 2.0 by the addition of pyrophosphoric acid. Agitation was then continued for an additional 15 minutes and the mixture permitted to form into layers which were then separated and assayed. The water layer, 88 ml., contained 1400 u./ml. The butanol layer, 105 ml., contained 70 u./ml. The distribution coefficient for the extraction was 0.05.

EXAMPLE V

One volume (100 ml.) of a butanol extract of bacitracin was mixed with 1 volume (100 ml.) of water. After agitating, the pH of the mixture was adjusted to 2.0 with citric acid. Agitation was thereafter continued for an additional 15 minutes and the mixture then permitted to form into layers which were separated and assayed. The water layer, 88 ml., contained 758 u./ml. The butanol layer, 111 ml., assayed 226 u./ml. The distribution coefficient for the extraction was 0.3.

EXAMPLE VI

Ten volumes (4000 ml.) of a butanol extract of bacitracin containing 200 u./ml. from a bacitracin fermentation beer was mixed with 1 part (400 ml.) of water. After agitation the pH of the mixture was adjusted to 2.0 with sulfuric acid. Agitation was then continued for an additional 15 minutes and the mixture permitted to form into layers which were separated and assayed. The butanol layer was reextracted several times with fresh 400 ml. portions of water, the pH being adjusted to 2.0 with sulfuric acid for each extraction. The results of each extraction are shown in Table II.

Table II

| Contact Number | Distribution Coefficient |
|---|---|
| 1 | 0.40 |
| 2 | 0.33 |
| 3 | 0.25 |
| 4 | 0.20 |
| 5 | 0.17 |

EXAMPLE VII

A series of experiments was carried out to show the effect of variation of the volume ratio of butanol to water. In each experiment the pH was adjusted to 2.0 with phosphoric acid, the procedure used being that of Example I. The results are shown in Table III.

Table III

| Volume ratio of butanol to water | Distribution Coefficient |
|---|---|
| 10 | 0.1 |
| 5 | 0.03 |
| 1 | 0.02 |

EXAMPLE VIII

A series of experiments was carried out to show the effect of variation of the pH. In each experiment one volume (100 ml.) of a butanol extract of bacitracin from a bacitracin fermentation beer was mixed with 1 volume (100 ml.) of water. The mixture was agitated and the pH adjusted by the addition of phosphoric acid. Agitation was continued for an additional 15 minutes and the mixture was allowed to separate into layers which were then analyzed. The results are shown in Table IV.

Table IV

| pH | Distribution Coefficient |
|---|---|
| 1.0 | .05 |
| 1.5 | .03 |
| 2.0 | .02 |
| 3.0 | .06 |
| 4.0 | .18 |

Now having disclosed our invention what we claim is:

1. In a process for the recovery of bacitracin, the step which comprises extracting bacitracin from a solvent selected from the group consisting of butyl alcohol and amyl alcohol with an aqueous solution of an acid selected from the group consisting of phosphoric, pyrophosphoric, sulfuric and citric acid, said extraction mixture having a pH less than 4.0.

2. In a process for the recovery of bacitracin, the step which comprises extracting bacitracin from a solvent selected from the group consisting of butyl alcohol and amyl alcohol with from 0.1 to 1 volume of water per volume of said solvent, the acidity of said extraction mixture being adjusted to a pH of less than 4.0 before said extraction with an acid selected from the group consisting of phosphoric, pyrophosphoric, sulfuric, and citric acid.

3. The process of claim 1 wherein the pH is 2.0.

4. The process of claim 2 wherein the pH is 2.0.

5. The process of claim 1 wherein the extraction is effected in a single operation with a volume of acidified water equal to the volume of alcohol.

6. The process of claim 1 wherein the extraction is effected by repeated extractions each employing at least 0.1 volume of acidified water per volume of alcohol.

MURRAY SENKUS.
PETER C. MARKUNAS.

(References on following page)

REFERENCES CITED

The following references are of record in the file of this patent:

UNITED STATES PATENTS

| Number | Name | Date |
|---|---|---|
| 2,457,887 | Goorley | Jan. 4, 1949 |
| 2,476,085 | Dimick | July 12, 1949 |

OTHER REFERENCES

Anker—on Bacitracin in J. Bact., Feb. 1948, volume 55, page 252.

Goorley—"Some Chemical and Physical Properties of Bacitracin," pages 1 to 3, paper presented at Conference on Antibiotics Research in Washington, D. C., on January 31–February 1, 1947, auspices National Inst. Health, Bethesda, Maryland.